United States Patent [19]
Kloss

[11] 3,997,632
[45] Dec. 14, 1976

[54] MONOFIL FABRIC FOR USE AS A PERPENDICULAR TRICKLE WALL IN EXCHANGE COLUMNS

[75] Inventor: Hans-Joachim Kloss, Hilden, Germany

[73] Assignee: Julius Montz GmbH, Hilden, Germany

[22] Filed: July 25, 1974

[21] Appl. No.: 491,898

Related U.S. Application Data

[62] Division of Ser. No. 308,391, Nov. 21, 1972, abandoned.

[30] Foreign Application Priority Data

Nov. 24, 1971 Germany .................... 2158171

[52] U.S. Cl. .......................... 261/103; 139/425 R; 261/112; 261/DIG. 72
[51] Int. Cl.$^2$ ............................................ B01F 3/04
[58] Field of Search ........ 139/420 R, 425 R, 425 A; 261/94, 100, 104, 112, 103

[56] References Cited

UNITED STATES PATENTS

| | | | |
|---|---|---|---|
| 1,794,624 | 3/1931 | Kastner | 139/425 A |
| 1,866,850 | 7/1932 | Green | 139/425 R |
| 1,915,931 | 6/1933 | Herrmann | 139/425 R |
| 2,032,712 | 3/1936 | Morrison et al. | 139/425 R |
| 2,088,447 | 7/1937 | Specht | 139/425 A X |
| 2,207,609 | 7/1940 | Buchanan | 139/425 A |
| 2,227,669 | 1/1941 | Parrett | 139/425 A |
| 2,288,512 | 6/1942 | Buchanan | 139/425 A |
| 2,615,699 | 10/1952 | Dixon | 261/94 X |
| 2,771,460 | 11/1956 | Kooistra et al. | 261/103 X |
| 2,921,776 | 1/1960 | Keeping | 261/94 |
| 2,937,644 | 5/1960 | Anderson | 261/103 X |
| 3,679,537 | 7/1972 | Huer et al. | 261/100 X |

FOREIGN PATENTS OR APPLICATIONS

| | | | |
|---|---|---|---|
| 124,256 | 8/1931 | Austria | 139/425 A |
| 1,020,190 | 2/1966 | United Kingdom | 261/94 |
| 484,742 | 5/1938 | United Kingdom | 139/425 A |

*Primary Examiner*—Tim R. Miles
*Assistant Examiner*—Richard L. Chiesa
*Attorney, Agent, or Firm*—Burgess, Dinklage & Sprung

[57] ABSTRACT

A monofil fabric for use as a perpendicular trickle wall in exchange columns wherein gas and liquid are contacted with one another, which comprises wires disposed in the same horizontal plane which wires are positioned contiguously to one another in groups, the spacing between a group of contiguously positioned wires and the next wire running in the same general direction being at least equivalent to the diameter of a wire of said group.

7 Claims, 4 Drawing Figures

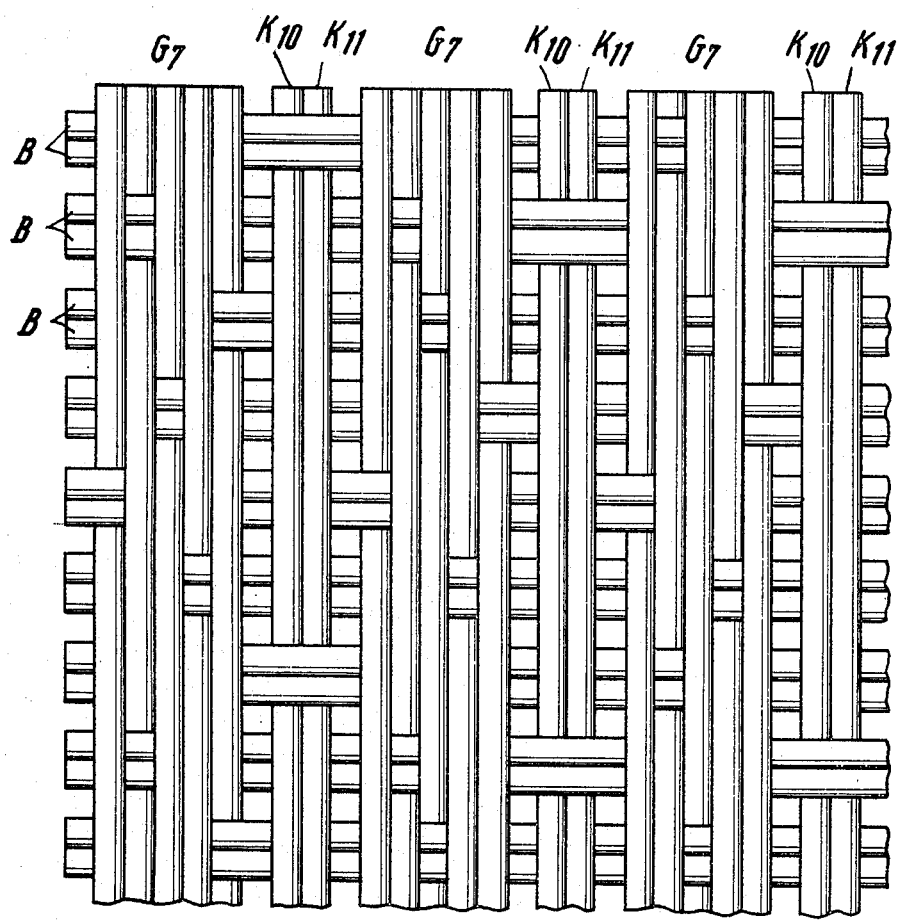

MONOFIL FABRIC FOR USE AS A PERPENDICULAR TRICKLE WALL IN EXCHANGE COLUMNS

This is a division of application Ser. No. 308,391, filed Nov. 21, 1972, now abandoned.

BACKGROUND OF THE INVENTION

1. Field of the Invention

This invention relates to a monofil fabric for use as a perpendicular trickle wall in exchange columns. More particularly this invention relates to such fabrics having groups of contiguously running wires spaced apart at least the width of a wire. Fabrics of this kind are known, in which either the warp threads or the filling threads lie horizontally when the fabric is mounted in the exchange column. The term monofil fabrics is to be understood to means fabrics made of metal or plastic wires.

2. Discussion of Prior Art

In prior-art fabrics of this kind, all of the horizontal wires are either contiguous with one another (so-called "Tressengewebe") or they are spaced from one another perpendicularly. In the former case the gas will undergo an exchange only with the liquid trickling down the one side of the fabric. In the latter case, the gas will work on both sides of the liquid in the area of the openings formed between the wires. For the latter purpose, a fabric is known in which the perpendicular spacing between the individual horizontal wires is slightly smaller than the wire diameter (West German Pat. Nos. 1,242,187 and 1,270,534). This measure is supposed to bring it about that the openings in the fabric will always be filled with liquid as a result of the capillary forces, and consequently preliminary flooding of the installed fabric will not be necessary.

It is the object of the invention to construct a monofil fabric for use as a perpendicular trickle wall in exchange columns, whose warp or filling wires will be disposed horizontally, in such a manner that, when the fabric is well wetted, the liquid will be uniformly distributed horizontally, adjacent liquid currents will be mixed with one another, and an optimum exchange between gas and liquid will be achieved.

SUMMARY OF THE INVENTION

In accordance with this invention there is provided a monofil fabric of the type employed in perpendicular trickle wall exchange columns which fabric comprises wires disposed in the same horizontal plane which wires are positioned contiguously to one another in groups, the spacing between the group of contiguously positioned wires and the next wire running in the same general direction being at least equivalent to the diameter of a wire of said group.

From the above description, it is apparent that the wires of the monofil fabric can be in the form of warp and filling wires or filaments in which the same are in the form of a weave. Alternatively, the wires can be such that a first set of walls runs in a first direction and wires perpendicular thereto are deposited thereover, it being understood that wires in at least one horizontal plane are positioned in groups, the groups generally being between 4 and 6 wires in number. Fabrics of the invention are suitable for use as wires in exchange columns.

In a particular desirable embodiment of the present invention, the spacing between groups of wires or a group of wires and an intermediate wire is such that it is at least equivalent in size to the diameter of a wire of the group of wires. Normally, each wire in a group will have the same diameter although such provision is not critical. Preferably, the spacing between a group of wires and an adjoining wire running in the same direction is greater than the diameter of any wire of the group of wires. Such is the case particularly when the fabric comprises a group of wires which alternate with single or pairs of wires disposed between groups of wires.

It should be understood that the wires of the fabric which are in the form of a group can be either the warp ends or the filling picks. The wires of a group are set to run contiguously. By the term "contiguously" there is meant that the fibers run generally parallel to one another in the same plane over or under wires running perpendicular thereto. For instance, a group of wires runs contiguously in the same plane when adjoining wires of the same group pass together over at least one filling pick. Generally speaking the warp end wires in a group will pass over between 2 and 10 filing picks running perpendicular thereto before passing under one such pick.

Numerous different wires are suitable for use in the claimed invention. They can be either of a synthetic nature or a metallic nature. Metallic wires useful include steel wire, copper wire, magnesium wire, iron wire, nickel wire and other ferrous and non-ferrous metal wires. Synthetic materials which can be formed into wires and used in the fabric of the invention include polyamides such as nylon 6, nylon 6/6, polyesters, polyolefins such as polyethylene and polypropylene, polyacrylonitrile, polyvinylchloride and other melt spinnable polymers, especially of the thermoplastic type.

As indicated above spacing between a group of wires and an adjoining wire outside the group is generally correlated to the diameter of the wires being employed. This diameter can vary between 0.1 and 1 mm, but is preferably between 0.1 and 0.7 mm. In the case of wires having a diameter around 0.2 mm the spacing between a wire of the group and an exterior wire will be at least as great as the wire diameter; in the case of somewhat larger wire diameters it can also be smaller than the wire diameter. Since these wires of one group upon weaving will deviate slightly from the central plane of the fabric the total width of such a group is slightly smaller than the sum of the diameters of the wires forming the group.

Above it was stated that a group of wires generally consists of between four and six wires. Smaller and larger groups may alternate with one another. In particular, it is possible for groups of wires to alternate with single wires or with pairs of single wires while maintaining the above-mentioned perpendicular spacing relationship, also in such a form, for example, that two individual wires are located between two groups and a space of the above-mentioned size is located both between a group and a wire and between the two individual wires.

Preferably, the warp wires of the fabric are horizontal after installation in the exchange column. The diameter of the perpendicular wires is greater, preferably by about 15 to 50%, than the diameter of the horizontal wires and the distance between these wires is preferably 1.5 to 2 times greater than their diameter. Instead of a perpendicular wire a group of contiguous wires can be provided.

Preferably the horizontal wires of a group lie loosely on a plurality of perpendicular wires, preferably in the manner of a satin weave. Such a weave facilitates the uniform distribution of the liquid in the horizontal direction. To counteract any tendency towards dragging of the fabric, it is recommendable to use a satin weave which reverses symmetrically after several repeats. The term wire in this case is considered to mean monofil materials of any kind, especially metal wires, which may consist of bronze or steel, for example, and monofilaments made of plastics.

BRIEF DESCRIPTION OF DRAWINGS

The drawings show several embodiments of the invention.

FIGS. 2–4 represent other fabrics or weaves in accordance with the invention, more enlarged.

DISCUSSION OF SPECIFIC EMBODIMENTS

Figure 1:
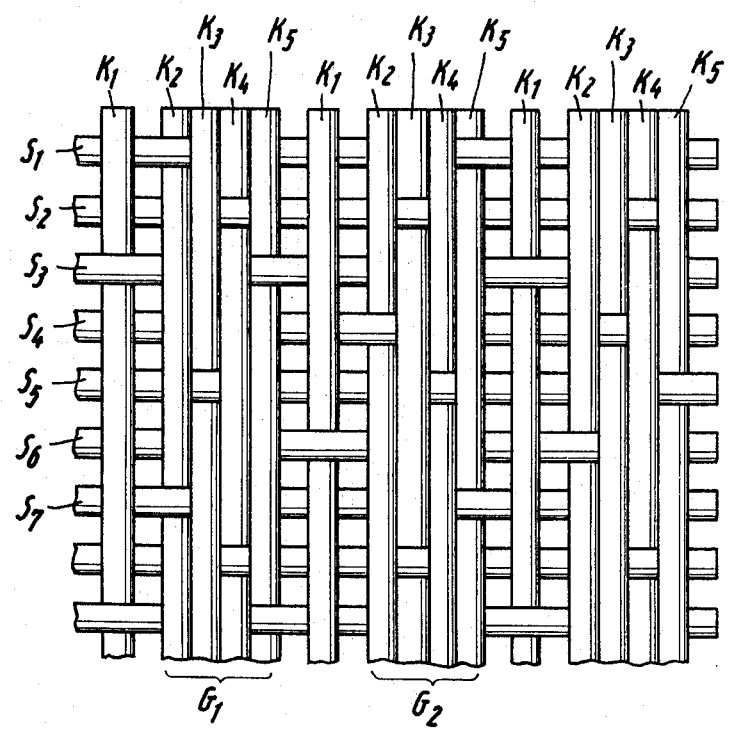
FIG. 1 is a greatly enlarged section of a fabric in accordance with the invention.

The piece of fabric represented in FIG. 1 consists of equal warp wires $K_1$ to $K_5$ in a repeating arrangement, and of equal filling wires $S_1$ to $S_7$. The warp wires $K_2$ to $K_5$ lie so closely together that the total width of the portion of fabric they form is slightly less than four times the diameter of a warp wire. Each group of warp wires $K_2$ to $K_5$ forms with the filling wires a 5-end satin weave. The weave of the lower group G2 forms a satin whose weave is a mirror image of the weave of the upper group G1. Between two groups G1, G2, lies a single warp wire K1. It, too, is bound at every fifth filling wire.

The space between the warp wire K1 and warp wire K5 on one side and K2 on the other is slightly greater than the thickness of a warp wire. The thickness of the filling wires is slightly greater than the thickness of the warp wires K1–K5, and the space between two filling wires is slightly larger than the diameter of a filling wire. Open meshes M of the fabric are thus produced, whose length and width are slightly greater than the diameter of the wires of which the fabric consists.

The thickness of the wires and their spacing depend on the particular circumstances involved. In many cases it is desirable to use for the filling wires whose diameter is 15 to 50% greater than the diameter of the warp wires. In the case of wires of 0.2 to 0.3 mm diameter the meshes will be able as a rule to have a size of 0.2 × 0.2 to 0.5 × 0.5 mm$^2$; in the case of appreciably thicker wires mesh sizes may suffice which are as much as 50% smaller than the wire thickness.

As a result of the satin weave, the contiguous warp wires form long, horizontal grooves acting as capillaries, which assure that applied liquid will receive a rapid, uniform horizontal distribution. Since the junctions of the satin weave are located far apart, they do not form preferred paths of flow for the liquid, such as can occur in the case of a plain weave or twill weave.

Figure 2:
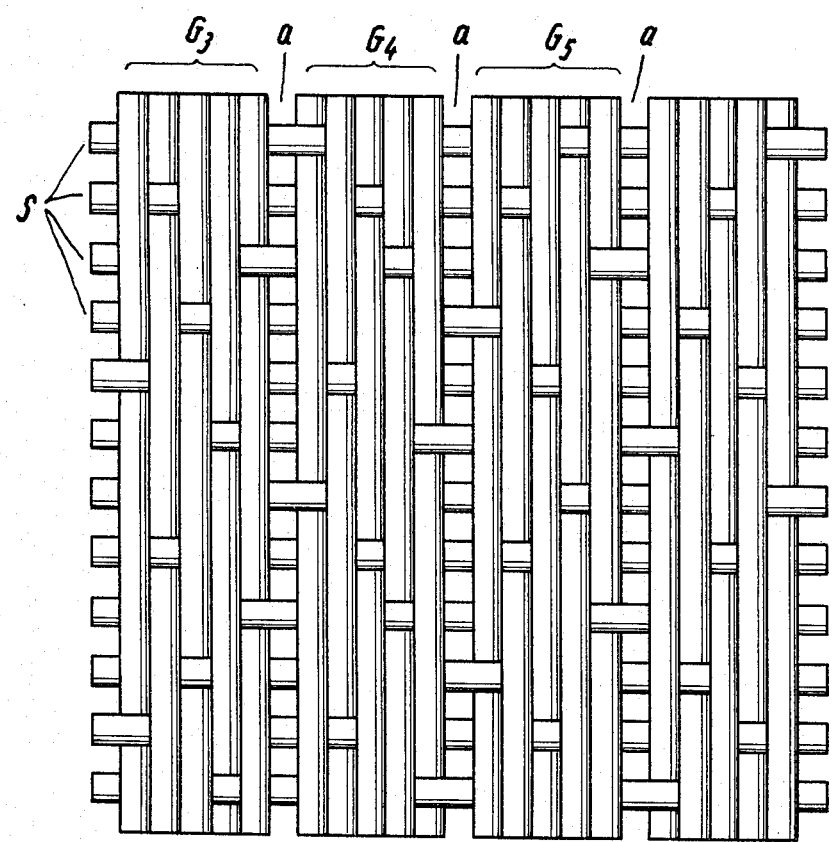

In FIG. 2 the fabric consists of identical groups G3, G4, G5, each having five contiguous warp wires which are bound by equally spaced filling wires S in a warp satin weave. Between every two groups there is an interval $a$ which is of the order of magnitude of the thickness of the warp wires, and especially in the case of smaller warp wire diameters is slightly larger than this diameter. Otherwise, the same applies here to the sizes of the wires and their spacing as has been explained above in connection with FIG. 1.

Figure 3:
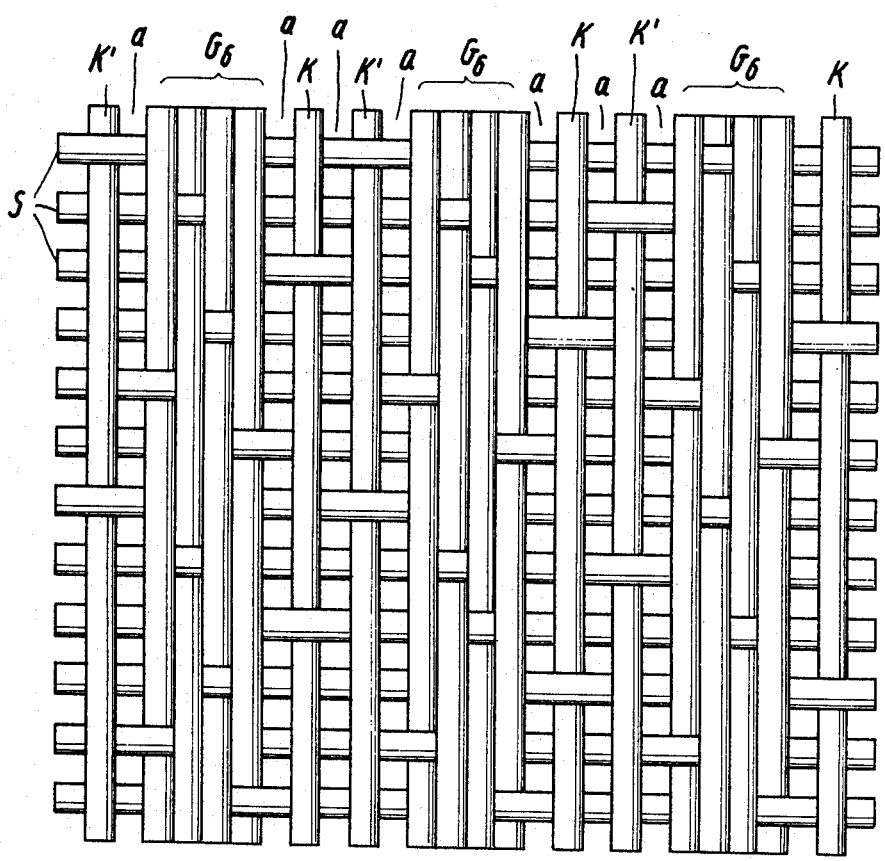

In the fabric of FIG. 3, groups G6 of four warp wires each alternate with groups of two individual warp wires K and K', an interval $a$, which is of the order of magnitude of the thickness of the warp wires; otherwise the above explanations apply.

In the fabric of FIG. 4, groups G7 of five warp wires alternate with two contiguous warp wires K10, K11, this fabric furthermore differs from the fabric of FIG. 1 in that, instead of single filling wires S, bundles B of several contiguous filling wires are provided.

What is claimed is:

1. In a column for vapor-liquid exchange a trickle wall in the form of a sheet-like material, which wall consists of a wire fabric arranged in a vertical plane, one part of the wires of said fabric being arranged vertically and parallel to one another, the other part of the wires of said fabric being arranged horizontally and parallel to each other, at least a part of said horizontally arranged wires being positioned contiguously and in touching contact to one another in groups, the vertical spacing between a group of contiguously positioned wires and the next group of said horizontal wires being at least about as great as the diameter of a wire of said next group of wires and greater than the spacing between individual horizontal wires in said group of wires, whereby when in use liquid accumulates at the junction of the horizontally running contiguously disposed wires, which liquid is distributed in the vertical spacing which separates the groups of contiguously positioned wires so as to avoid the formation of rivulets as said liquid descends vertically over said trickle wall.

2. In a column according to claim 1, the spacing between vertically arranged wires being between 1.5 to 2 times their diameter.

3. In a column according to claim 1, a group of wires comprising between four and six wires.

4. In a column according to claim 1, a single horizontal wire disposed horizontally between groups of horizontal wires.

5. In a column according to claim 1, the diameter of vertically arranged wires being greater than the diameter of any horizontally arranged wire.

6. In a column according to claim 1, the fabric in a group of horizontally arranged wires being in a satin weave.

7. In a column according to claim 6, the satin weave being inverted in consecutive groups of horizontally arranged wires.

* * * * *